July 31, 1973  E. BRICHARD  3,749,564
GLASS MELTING FURNACE FLOW CHANNEL SUPPORT
Filed May 5, 1971  4 Sheets-Sheet 1

INVENTOR
Edgard Brichard

BY *Spencer & Kaye*

ATTORNEYS.

July 31, 1973   E. BRICHARD   3,749,564
GLASS MELTING FURNACE FLOW CHANNEL SUPPORT
Filed May 5, 1971   4 Sheets-Sheet 3

INVENTOR
Edgard Brichard

BY *Spencer & Kaye*

ATTORNEYS

INVENTOR
Edgard Brichard

ATTORNEYS

United States Patent Office 3,749,564
Patented July 31, 1973

3,749,564
GLASS MELTING FURNACE FLOW CHANNEL SUPPORT
Edgard Brichard, Jumet, Belgium, assignor to Glaverbel S.A., Watermael-Boitsfort, Belgium
Filed May 5, 1971, Ser. No. 140,511
Claims priority, application Great Britain, May 7, 1970, 22,173/70
Int. Cl. C03b 17/00, 18/00
U.S. Cl. 65—184       19 Claims

ABSTRACT OF THE DISCLOSURE

In a glass melting furnace having a flow channel for delivering molten glass to glass forming apparatus, clamping means applying a horizontal clamping force to the sides of at least a portion of the channel floor for completely supporting that portion of the floor when the furnace is in use and thus eliminating the need for any medial support structure beneath, and between the sides of, the channel floor portion in the region where such support structure would require forced cooling.

BACKGROUND OF THE INVENTION

The present invention relates to furnaces for use in the production of glass and having a channel along which molten glass flows from the furnace.

In such furnaces, the discharge end of the channel is provided with a spout having an end portion, or lip, over which the glass flows to the glass-forming apparatus. The glass may for example, pass to rollers for forming into rolled glass, to a drawing machine in which the molten glass is drawn downwardly as a ribbon, or to a tank in which there is a supporting surface on which the glass spreads out and/or is transported, e.g. a float glass tank.

The bottom of the channel is normally composed of refractory blocks extending transversely of the channel and held up by an underlying support structure to prevent them from sagging when exposed to operating conditions, i.e. high temperatures, for long periods of time. The use of such supporting structures is not always convenient due to limited space being available for accommodating them, or for other reasons.

SUMMARY OF THE INVENTION

It is a primary object of the present invention to eliminate the above inconveniences.

Another object of the invention is to improve the structure of the channel of such a glass production furnace.

A more specific object of the invention is to improve the support of the bottom of such a channel.

These and other objects according to the present invention are achieved in that, in a glass-melting furnace having a channel along which molten glass flows from the furnace, at least one portion of the bottom wall of the channel is held, without any medial floor support, between clamping members which, at least when the furnace is in use, exert clamping pressure horizontally, or having a horizontal component, against the lateral sides of, that wall portion. Medial support is here intended to mean support located between the sides of the wall portion.

By virtue of the clamping pressure, the clamped bottom wall portion or portions are adequately supported, even under operating conditions. The invention thus enables medial bottom support structures to be dispensed with entirely, or at a given region or regions where the use of such a structure may be undesirable for one reason or another. Consequently, there is greater freedom in planning the site of the furnace in the factory, in that the furnace may be located where the provision of such a channel support structure would be impossible or inconvenient, or the furnace may be arranged so that there is a free space, available for other purposes, beneath the clamped bottom wall portion or portions.

Preferably, the clamping members are located to exert clamping pressure at opposed sides of the channel.

DESCRIPTION OF THE PREFERRED EMBODIMENTS

Figure 1:
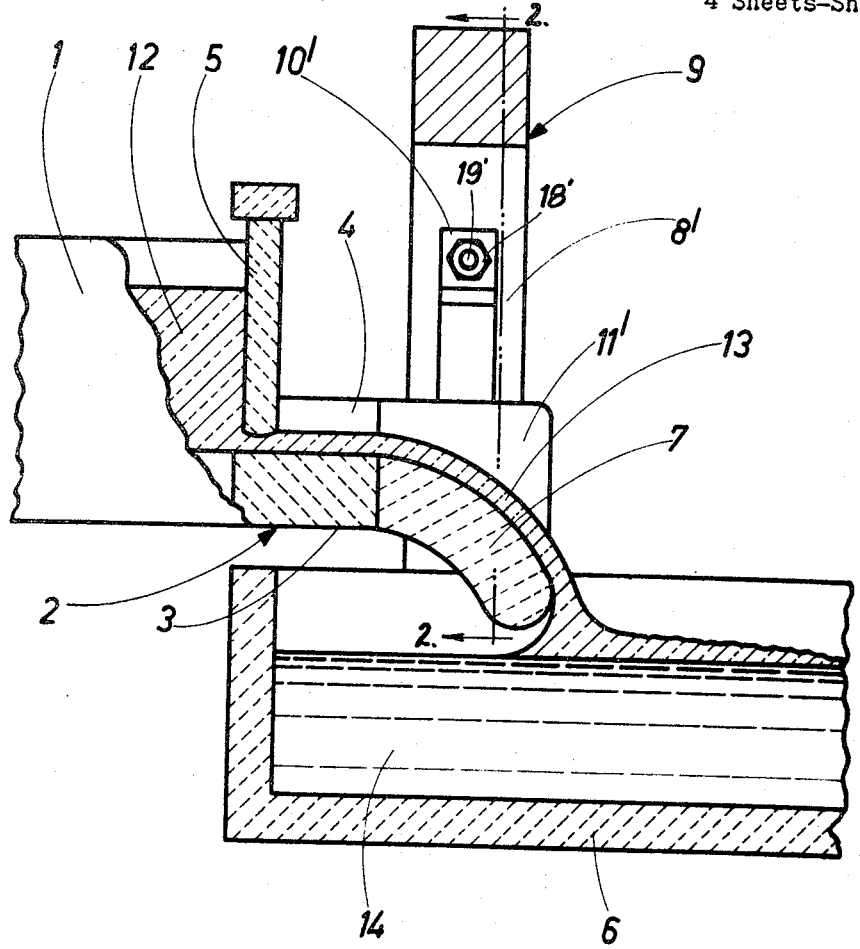
FIG. 1 is a partly cross-sectional elevation of part of a glass-melting furnace according to the invention and an associated float tank.

In certain embodiments of the invention, the channel faces against which the clamping pressure is exerted are vertical. In that case it is not necessary to use specially shaped components in the construction of the channel.

In other embodiments, such channel faces are inclined in a direction to cause the clamping pressure to establish an upward component of thrust.

The clamping members preferably apply clamping pressure at least at the level of the lower part of the thickness of the clamped floor portion. This contributes to rendering the clamping-type support particularly effective.

The avoidance of the necessity for a medial bottom support structure is particularly advantageous at places where the temperature is so high that such a structure would, if present, require a substantial amount of cooling. Cooling systems for this purpose involve a further complication in the plant construction and, in some cases, the action of such a cooling system creates flaws in the resulting glass sheets. For example, when feeding molten glass to a float tank over a refractory spout, there is a considerable risk of spoiling the glass at a point below or behind the spout lip if this has to be supported by a cooled support structure.

In preferred embodiments of the invention therefore, at least a portion of the floor of the channel spout is subjected to clamping pressure in accordance with the invention. Such spout is often exposed to very high temperatures in many types of plants and is situated where the provision of a cooled medial bottom support would have adverse effects on the glass product.

In particularly preferred embodiments, at least the bottom of the lip portion of the spout is subjected to clamping pressure in accordance with the invention. The operating conditions at the lip portion are such that the provision of a satisfactory medial bottom support in that region presents a particularly difficult problem.

Advantageously, at least one floor portion subjected to such clamping pressure is composed of a single refractory block. The number of joints in the floor can then be relatively few, with the advantage that the wall is more resistant to corrosion by the molten glass.

Advantageously, at least one clamped floor portion is composed of a single refractory block extending across the full width of the bottom of the channel, the clamping pressure being applied at the channel sides. A very rigid wall portion can be provided in this way.

Such a refractory floor block can be shaped to provide integral side wall portions of the channel. Alternatively, side wall portions may be formed by separate side blocks located at or near the ends of such floor block, e.g. against the end faces of such block or upon its upper surface.

In other forms of construction, according to the invention, at least one clamped floor portion is composed of a row of two or more refractory floor blocks. Side blocks can be present at the ends of the row of floor blocks, or side blocks extending above the tops of the row of floor blocks can be interposed between the floor blocks and the opposed clamping members. Blocks of small size can thus be used, which is an advantage if renewal of part of the floor wall becomes necessary.

Two or more rows of floor blocks may be supported by common clamping means. The clamping system is thereby simplified.

According to one advantageous feature of the invention, two or more floor blocks of a row subjected to clamping pressure are held in correct mutual relationship by interengagement of such blocks or by some other type of interblock connection. One suitable form of connection is a pin and socket type connection which may be effected, for example, by providing pins in one block which engage in registering sockets of the adjacent block.

Preferably, the clamping forces are exerted transversely of the channel over a section of its length or over two or more sections of its length, as hereinbefore referred to. However, instead of supporting one or more floor portions by transverse clamping pressure, one or more floor portions may be supported by clamping pressure acting in the longitudinal direction of the channel i.e., in the direction of flow of the glass.

Preferably, a floor portion located between clamping members is supported on supporting members located beneath the side margins of the channel where clamping pressure is applied. The side margins are thereby supported in correct position in relation to the clamping members. Alternatively, or in addition, a floor portion may interengage with the clamping members and/or may be held at or near side margins thereof by suspension means, e.g., supporting rods.

Preferably, means are provided for adjusting the clamping pressure exerted by the clamping members. The clamping pressure can then be set appropriately to suit the conditions of use. By way of example, clamping pressure may be exerted via adjustable clamping screws or screw-jacks.

Advantageously, the clamping members include arms of a U-shaped frame or yoke which can elastically yield to a limited extent to expansion forces occurring in the clamped section or sections of the channel. Such a yoke is preferably mounted so that it can be easily removed from the furnace structure as a unit together with the clamped channel section or sections. This greatly facilitates the installation and replacement of such section or sections or of particular wall portions thereof. The yoke may carry two brackets for supporting margins of the said channel section or sections.

The clamping members preferably include one or more springs. Such spring or springs can be disposed at one side or end of a clamped floor portion, where clamping pressure is applied, but it is preferable to provide springs which are disposed symmetrically at opposite sides or ends of the section of the channel subjected to the clamping pressure so as to avoid a non-symmetrical deformation and possible lateral displacement of the clamped structure. The springs can be of any type, e.g., of spiral, helical, disc or leaf type.

Preferably, there are rigid members, directly in contact with the channel for distributing the clamping forces over a certain area of the channel structure.

One embodiment where clamping pressure is exerted against vertical faces of the channel is shown in FIG. 1 and includes a tank furnace forehearth channel 1 containing molten glass 12 which continuously flows as a layer 13 along a spout portion 2 composed of a floor 3 and side walls, or jambs, 4, only one of which appears in the drawing. The thickness of the layer of molten glass issuing from the forehearth is determined by a vertically adjustable regulating tweel 5. The layer of molten glass flows onto a bath 14 of, for example, molten tin in a float tank 6, and the glass spreads out on the surface of the bath and moves continuously along that surface towards the outlet end of the float tank from which the formed glass ribbon is continuously withdrawn.

The lip 7 of the spout portion 2 consists of a row of refractory blocks extending across the width of the spout portion transversely to the length of channel 1. Electrocast refractory blocks with a high content of alumina and zirconia, e.g., as sold commercially under the trademark Zac, are quite suitable for forming the lip.

The lip block 7 presents a curved surface over which the glass stream 13 flows from the level of the substantially horizontal channel 2 to the lower level of float bath 14. The gradual curvature of the lip surface permits the glass stream to undergo a smooth transition from the channel to the bath surface without experiencing any discontinuities or marked change in thickness. The lower end of lip block 7 is curved to not present any sudden break in the surface supporting the glass stream and to further aid the smooth flow of the stream onto the float bath surface. The lower end of block 7 is generally located a small distance above the surface of bath 14.

Figure 2:
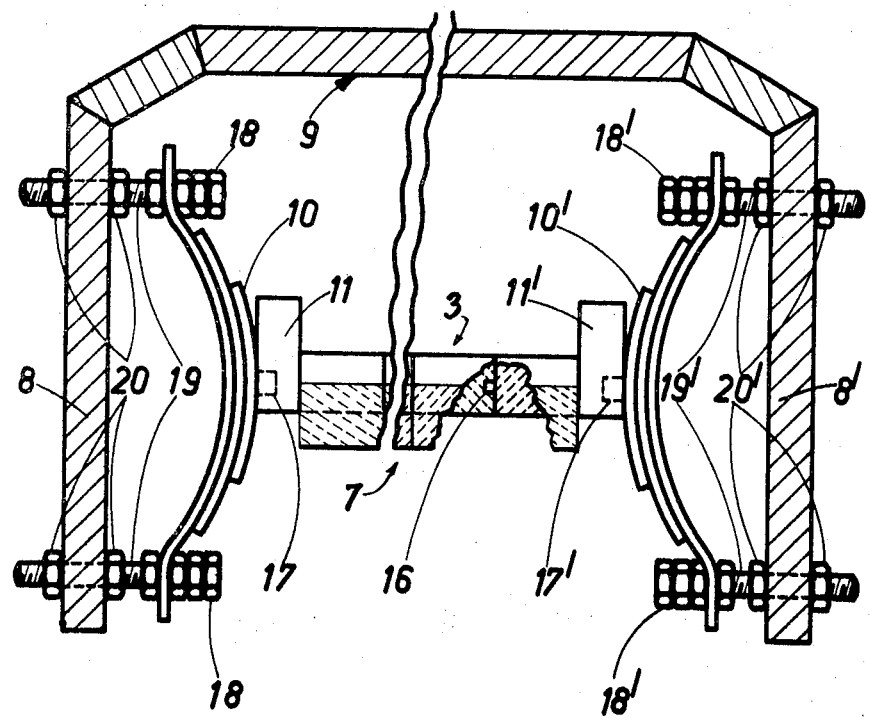
FIG. 2 is a front cross-sectional view along the line 2—2 of FIG. 1 of the end parts of the block assembly forming the spout lip of the furnace, with the float tank and molten glass removed.

The row of refractory blocks forming the lip 7 is clamped as shown in FIG. 2 between the arms 8 and 8' of a yoke 9 which is formed of metal and is detachably secured to the structural framework of the tank furnace. The clamping pressure is transmitted by laminated leaf springs 10 and 10', placed between the yoke arms 8 and 8' and side blocks 11 and 11' against which the clamping pressure is exerted. The laminated springs 10 and 10' are secured by screw-threaded nuts 18 and 18' on threaded bolts 19 and 19' which extend through the yoke arms 8 and 8'. The axial positions of the bolts 19 and 19' relative to the yoke arms can be adjusted by means of cooperating locating nuts 20 and 20' thereby to vary the preloading of the springs.

The laminated springs have central bosses 17 and 17' which are inserted in sockets in the side blocks 11 and 11' to keep these properly located in relation to the springs. The lip blocks located between the side blocks 11 and 11' are held in correct position in relation to each other and to the side blocks by pin and socket connections such as the connection 16 shown in the portion of FIG. 2 where the downstream end of the lip is partly broken away. It will be observed that the clamping pressure exerted by the springs 10 and 10' on the lip blocks is exerted at the lower portion of the thickness of the floor 3 of the spout portion.

Figure 3:
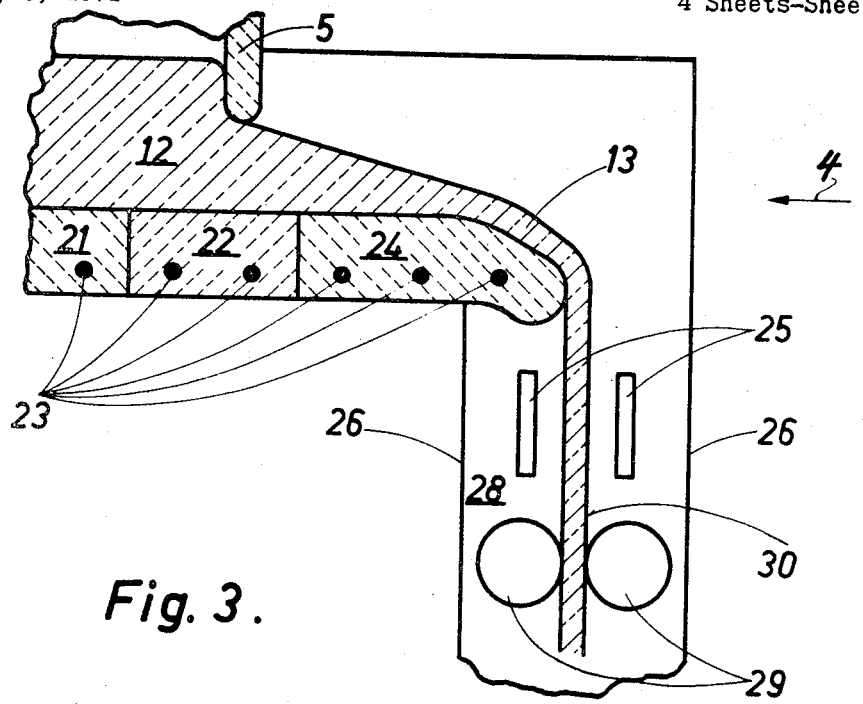
FIG. 3 is a cross-sectional elevational view of part of the spout of another embodiment of the invention.
Figure 4:
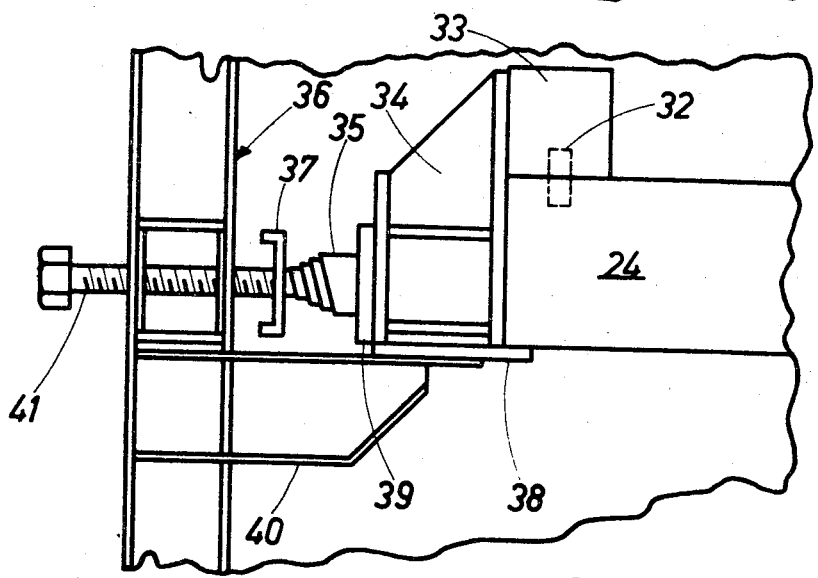
FIG. 4 is a front view in the direction of the arrow 4 of FIG. 3 of part of the lip and part of its supporting system, with the molten glass removed.

In the embodiment shown in FIGS. 3 and 4, the floor of the furnace spout is formed by blocks 21, 22 and 24, each of which is a one-piece block extending transversely from one side of the spout to the other. Each of the three blocks 21, 22 and 24 is rendered self-supporting by clamping pressure concentrated at the spots 23 indicated in FIG. 3.

Molten glass 12 from the furnace flows under tweel 5 and over the lip block 24 as a layer 13 the thickness of which can be regulated by adjusting the tweel 5. The layer of glass forms a continuous glass ribbon 30 which is drawn downwardly, assisted by its weight, through a vertical shaft 28 as defined by walls 26. The ribbon is drawn down by rollers 29 and passes between coolers 25.

As shown in FIG. 4, the floor block 24 defining the lip carries small side blocks 33, each of which is located by means of a pin 32 which engages in sockets formed in blocks 24 and 33.

At each side, only one of which is shown in FIG. 4, the clamping force for rendering the lip block 24 self-supporting is applied by means of three clamping screws 41 passing through threaded bores in the welded yoke structure 36. The screws 41 bear against a horizontally extending channel shaped rail 37 which in turn bears against three spiral springs 35 made of strip metal and having their axes coincide with the points 23 shown on lip block 24 in FIG. 3. These springs are carried by a housing 39 provided on a welded or cast abutment 34 serving as a pressure-distributing element. The abutment 34 carries a bottom plate 38 which rests on a bracket 40 carried by the yoke 36. The plate 38 extends beneath, and supports, the corresponding end margin of the refractory lip block 24.

The other floor blocks 21 and 22 of the spout portion are supported by clamping pressure in a manner similar to that of lip block 24.

Figure 5:
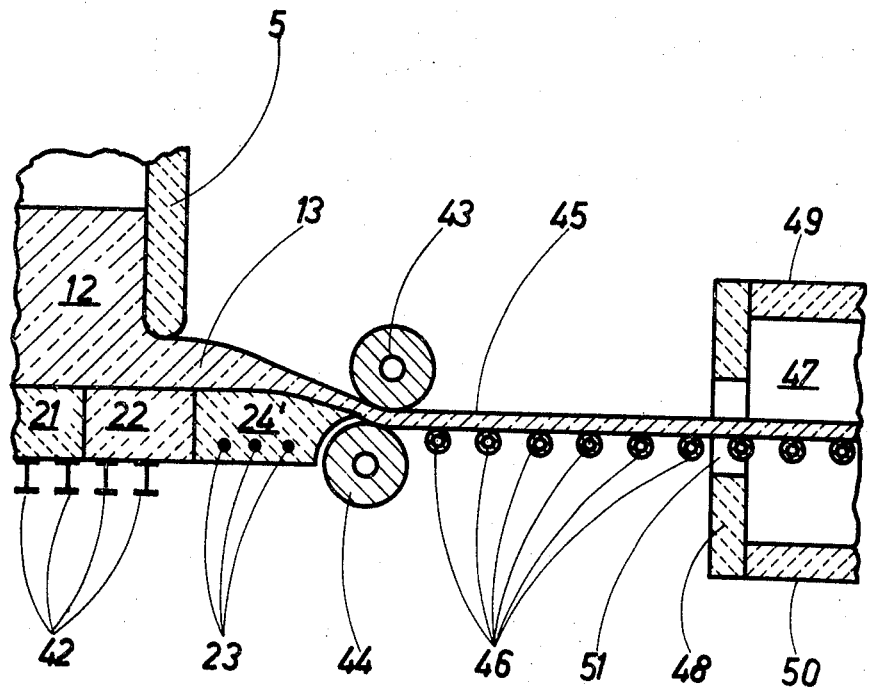
FIG. 5 is a cross-sectional elevational view of part of an installation for producing rolled flat glass according to another embodiment of the invention.

Referring now to FIG. 5, there is shown a glass-melting furnace with a channel analogous to the spouts of FIGS. 1–4, having floor blocks 21, 22 and 24'. Molten glass 12 held in the channel flows under a regulating tweel 5 as a layer 13 which flows over block 22 and lip block 24' and passes between refractory steel rollers 43 and 44 which roll the glass into a ribbon 45 of the required thickness. The ribbon 45 is conducted from these rollers 43, 44 by transporting rolls 46 to an annealing lehr 47, having an entry end wall 38, a top wall 49 and a bottom wall 50, the ribbon being conveyed into the lehr through an entry opening 51 in the end wall 48.

In the case of the furnace channel shown in FIG. 5, the floor blocks 21 and 22 are supported by I-section steel bars 42. The lip block 24 is supported only at its lateral sides in accordance with the invention. This latter block does not have any supporting structure beneath its central region. The lip block is held, at its sides only, by means similar to that used for supporting the lip block 24 in the embodiment shown in FIGS. 3 and 4. Clamping pressure is applied to the sides of the block and is concentrated at the spots 23. By virtue of this clamping pressure the block is prevented from sagging under the operating conditions existing in the furnace.

In the illustrated embodiments of the invention, the clamping forces can be in part or entirely dependent on the thermal expansion of the clamped portion of the channel. In such a case, a positive medial supporting means may be provided for the appertaining bottom wall portion or portions to serve as a temporary support preparatory to heating of the furnace. The clamping forces dependent on thermal expansion can be adjusted by means which compress or flex or otherwise yield under such expansion forces, or by means of regulating devices of the screw type or some other type.

Advantageously, adjustable means are provided for effecting an initial clamping pressure on the floor portion or portions to be held by clamping and the clamping pressure increases during the establishment of the working temperature. The adjustable means can then be regulated to establish the desired clamping pressure during operation of the furnace.

Advantageously, the clamping members are composed of one or more elements for limiting the degree of the clamping forces. Thus, the clamping forces can be maintained within a required range notwithstanding expansion or contraction, possible phase transformation within the refractory material or other occurences responsible for dimensional changes. In order to limit the clamping pressure, the clamping forces may be applied, for example, via springs and nuts.

As shown in FIGS. 2 and 4, the clamping forces exerted by the springs 10 and 10' (FIG. 2) and clamping screws 41 (FIG. 4) may be respectively limited in a predetermined range by nuts 20, 20' or by spring 35.

It will be undersetood that the above description of the present invention is susceptible to various modifications, changes and adaptations, and the same are intended to be comprehended within the meaning and range of equivalents of the appended claims.

I claim:

1. A system for delivering molten glass from a glass melting tank furnace to glass forming apparatus, said system comprising, in combination: means defining a glass flow channel extending from the furnace and composed of a floor and side walls; and clamping means disposed adjacent the lateral sides of said channel and applying to at least a portion of said channel a clamping force having a horizontal component transverse to the direction of glass flow in the channel, said clamping means providing a net compressive clamping force between the lateral sides of said floor and in a direction to place the portion of said floor between such lateral sides under compression and of sufficient amplitude to completely support said channel portion under normal furnace operating conditions, said channel portion being free of any medial floor support located between its lateral sides under normal furnace operating conditions.

2. Apparatus as defined in claim 1 wherein said clamping means comprise clamping members located at opposed lateral sides of said channel and exerting a clamping force on said channel.

3. Apparatus as defined in claim 2 wherein said floor is composed of blocks and said clamping members are disposed for applying a clamping force to the lower part of the thickness of said blocks.

4. Apparatus as defined in claim 2 wherein, at the outlet end of said channel, said floor is in the form of an outlet spout and said clamping means apply a clamping force to said outlet spout.

5. Apparatus as defined in claim 4 wherein said spout is constituted by a downwardly curved lip portion, and said clamping means are arranged to apply the clamping force to said lip portion.

6. Apparatus as defined in claim 1 wherein at least part of said floor of the portion of said channel subjected to the clamping force is constituted by a single refractory block extending across the entire width of said channel.

7. Apparatus as defined in claim 1 wherein at least part of said floor of the portion of said channel subjected to the clamping force is constituted by a plurality of refractory blocks disposed in a row across the width of said channel.

8. Apparatus as defined in claim 7 wherein there are a plurality of said rows of refractory blocks supported in common by said clamping means.

9. Apparatus as defined in claim 7 wherein said refractory blocks of said row are provided with means whereby said blocks of said row are interconnected with one another.

10. Apparatus as defined in claim 1 further comprising support means upon which the lateral edges of said floor rest along the portion of said channel to which the clamping force is applied.

11. Apparatus as defined in claim 1 further comprising interengaging means connecting said channel to said clamping means.

12. Apparatus as defined in claim 1 wherein said clamping means comprise clamping members bearing against the lateral sides of said channel, and means associated with said clamping members for adjusting the clamping force exerted on said channel.

13. Apparatus as defined in claim 1 wherein said clamping means comprises an element for limiting the magnitude of the clamping force.

14. Apparatus as defined in claim 1 wherein said clamping means comprise a U-shaped yoke having vertical legs and a cross-piece extending between, and interconnecting, the upper ends of said legs, and clamping force applying members supported by said legs and bearing against the lateral sides of said channel, said clamping means constituting means which yield elastically to thermal expansion forces occurring in said portion of said channel.

15. Apparatus as defined in claim 1 wherein said clamping means comprise at least one resilient spring bearing against said portion of said channel.

16. Apparatus as defined in claim 15 wherein there are at least two springs, each disposed adjacent a respective lateral side of said portion of said channel.

17. Apparatus as defined in claim 16 wherein there are a plurality of said springs along each lateral side of said portion of said channel, and said clamping means further comprises a rigid member disposed along each lateral side of said channel and interposed between its associated channel side and said springs adjacent that channel side for distributing the clamping forces produced by said springs uniformly over a region of said channel.

18. Apparatus as defined in claim 1 further comprising a glass melting tank furnace having its interior in communication with said channel.

19. Apparatus as defined in claim 1 wherein, at the outlet end of said channel, said floor is constituted by an outlet lip having a gradual downward curvature toward the outlet end of said channel.

References Cited

UNITED STATES PATENTS

| | | | |
|---|---|---|---|
| 1,698,491 | 1/1929 | Brasseur et al. | 65—184 X |
| 3,345,150 | 10/1967 | Ihrig | 65—184 |
| 3,360,354 | 12/1967 | Bates | 65—184 |
| 3,305,339 | 2/1967 | Plumat | 65—99 |
| 3,348,937 | 10/1967 | Plumat | 66—333 |
| 2,384,073 | 9/1945 | Campbell | 65—343 |
| 1,805,218 | 5/1931 | Mambourg | 65—341 X |
| 3,437,470 | 4/1969 | Overman | 66—333 X |
| 3,539,321 | 11/1970 | Montgomery et al. | 65—99 A |
| 1,841,548 | 1/1932 | Nobbe | 65—184 |

S. LEON BASHORE, Primary Examiner

K. M. SCHOR, Assistant Examiner

U.S. Cl. X.R.

65—99 A, 182 R, 185, 333, 341, 346